Jan. 22, 1957  R. HABERMANN, JR  2,778,963
POLYPHASE GENERATORS
Filed June 10, 1955  2 Sheets-Sheet 1
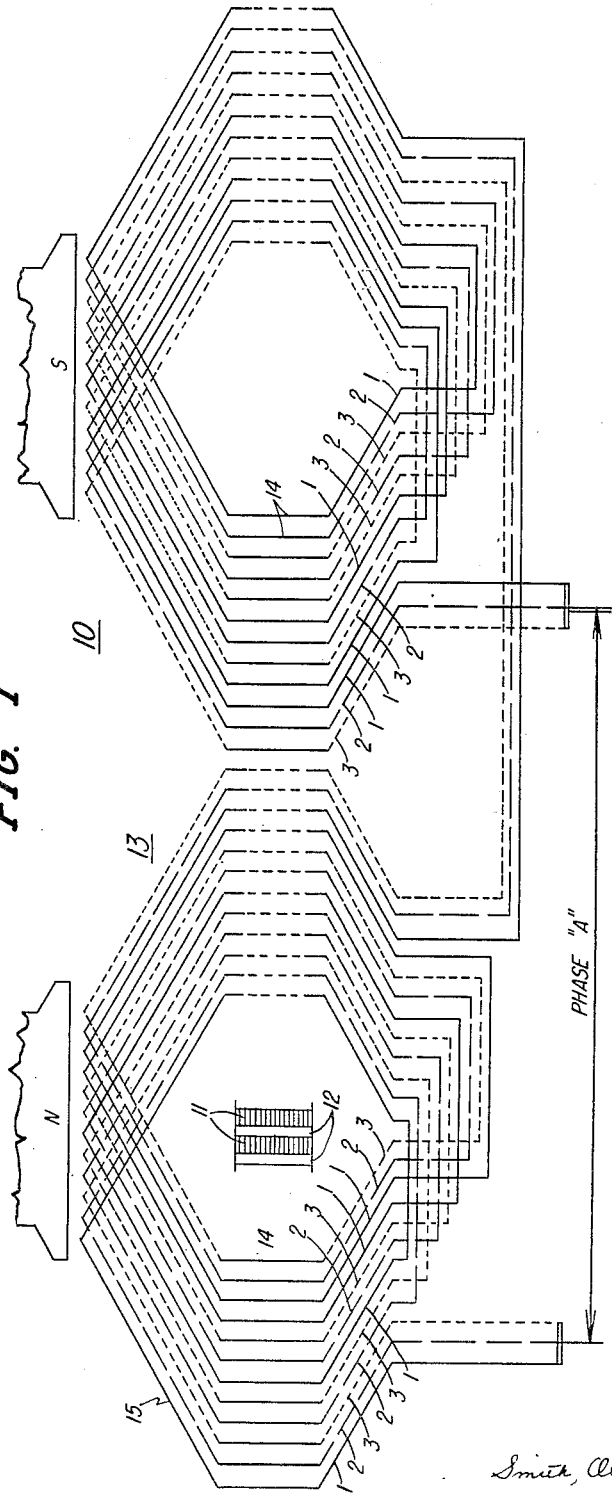
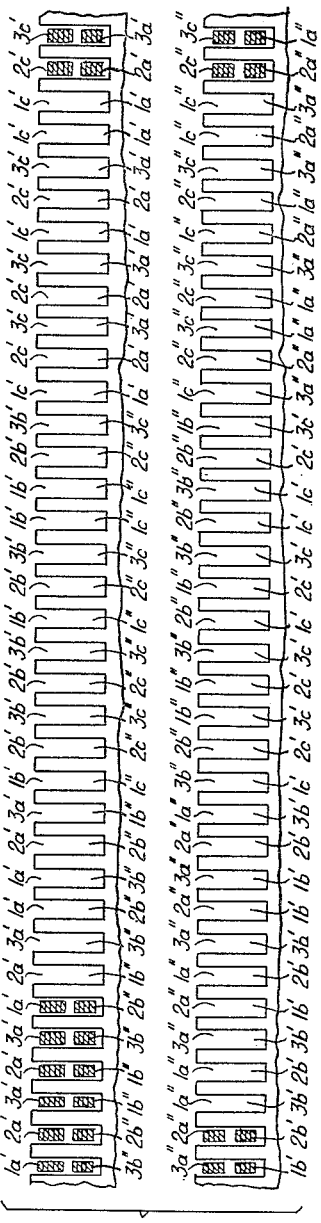
INVENTOR.
Rudolph Habermann Jr
BY
Smith, Olsen, Baird & Miller,
Attys.

Jan. 22, 1957  R. HABERMANN, JR  2,778,963
POLYPHASE GENERATORS
Filed June 10, 1955  2 Sheets-Sheet 2

INVENTOR.
Rudolph Habermann Jr.
BY
Smith, Olsen, Baird & Miller,
Attys.

United States Patent Office 2,778,963
Patented Jan. 22, 1957

2,778,963

POLYPHASE GENERATORS

Rudolph Habermann, Jr., Schenectady, N. Y., assignor to General Electric Company, a corporation of New York Application June 10, 1955, Serial No. 514,511

12 Claims. (Cl. 310—202)

The present invention relates to dynamoelectric machines, and more particularly to improved armature windings for polyphase generators of large size.

A conventional turbine-driven polyphase generator of large size comprises a stationary armature element and a cooperating rotatable field element, and may be operative to generate 3-phase electric power at a frequency of 60 cycles, whereby the field element, if of 2-pole construction, is rotated at 3600 R. P. M. In the generator, the armature element or core is formed of magnetizable material and is normally provided with an elongated cylindrical opening therethrough that is bounded by a number of angularly spaced-apart winding slots, in which a composite 3-phase armature winding is carried, the armature winding including three individual phases that are frequently connected in Y or star relation to supply the load. The field element is also formed of magnetizable material and is normally of the elongated cylindrical-rotor type and carries a field winding, the field element being arranged in the armature opening and being operative upon rotation to induce phase voltages in the respective phases of the armature winding.

Ordinarily, each phase of the armature winding includes a number of phase belts each provided with a plurality of series connected coils each having two coil sides, the coil sides being distributed in the winding slots of the armature element; the armature winding is arranged in two layers so that each winding slot receives two of the coil sides respectively disposed in the top and in the bottom thereof; and each of the coil sides includes an insulating casing enclosing the conductors thereof for the purpose of electrically insulating the coil side from the contiguous coil side and form the armature element.

In directly cooled machines, each of the winding slots also accommodates facility for cooling the two contained coil sides, which cooling facility ordinarily includes a duct arrangement through which a current of air or other gas, or stream of liquid is forced; whereby each of the slots must accommodate two of the coil sides, as well as the cooling facility therefor; and each of the coil sides includes the conductors thereof and the enclosing insulating casing.

Now in the design of polyphase generators, there is an ever-increasing demand for greater power ratings; whereby the competition for space in the armature between the magnetic material thereof and the winding slots therein, and among the several elements arranged in each winding slots thereof, presents design problems of ever-increasing complexity.

Accordingly, it is a general object of the present invention to provide in a polyphase generator an improved arrangement of the composite armature winding so that an increased power output may be realized from a generator structure of given physical dimensions; whereby the power output per unit volume of the generator structure is substantially increased.

Another object of the invention is to provide a polyphase generator having a relatively high power output and a relatively low voltage rating and comprising a composite armture winding provided with three parallel circuits per phase per pair of poles in which the circulating current losses caused by the unbalanced voltages in the parallel circuits are negligible.

A further object of the invention is to provide a dynamoelectric machine provided with a polyphase winding including in each phase three parallel circuits arranged in a pair of series connected sections respectively disposed in a pair of oppositely poled phase belts.

A further object of the invention is to provide a dynamoelectric machine of the character described, wherein each section of the three parallel circuits in each phase belt comprises a given number of series connected coils each having two coil sides, and wherein the coil sides of the section of the three parallel circuits are arranged in a predetermined sequence in the slots in the phase belt arranged to minimize voltage and phase unbalance among the individual elements of the section of the three parallel circuits.

A further object of the invention is to provide a dynamoelectric machine of the character described, wherein the two sequences of the coil sides of the three parallel circuits in the two phase belts are different and arranged to minimize voltage and phase unbalance among the three parallel circuits in each phase.

A further object of the invention is to provide a dynamoetlectric machine of the character described, wherein the two sequences of the coil sides of the three parallel circuits in the two phase belts bear a "mirror image" relationship with respect to each other so as to eliminate altogether phase unbalance among the three parallel circuits in each phase.

A still further object of the invention is to provide a dynamoelectric machine provided with a polyphase winding incorporating an improved arrangement of the elements thereof.

Further features of the invention pertain to the particular arrangement of the elements of the polyphase generator, whereby the above-outlined and additional operating features thereof are attained.

The invention, both as to its organization and principle of operation, together with further objects and advantages thereof, will best be understood by reference to the following specification taken in connection with the accompanying drawings, in which:

Figure 1 is a diagrammatic illustration of a portion of a dynamoelectric machine provided with an armature winding embodying the present invention, the machine being in the form of a generator of 3-phase, 2-pole, 72-slot core construction, the armature winding having three parallel circuits per phase, only one phase of the 3-phase armature winding being illustrated;

Fig. 2 is an enlarged fragmentary sectional view of the armature element of the generator and the 3-phase armature winding carried in the slots of the core thereof.

Figure 3:
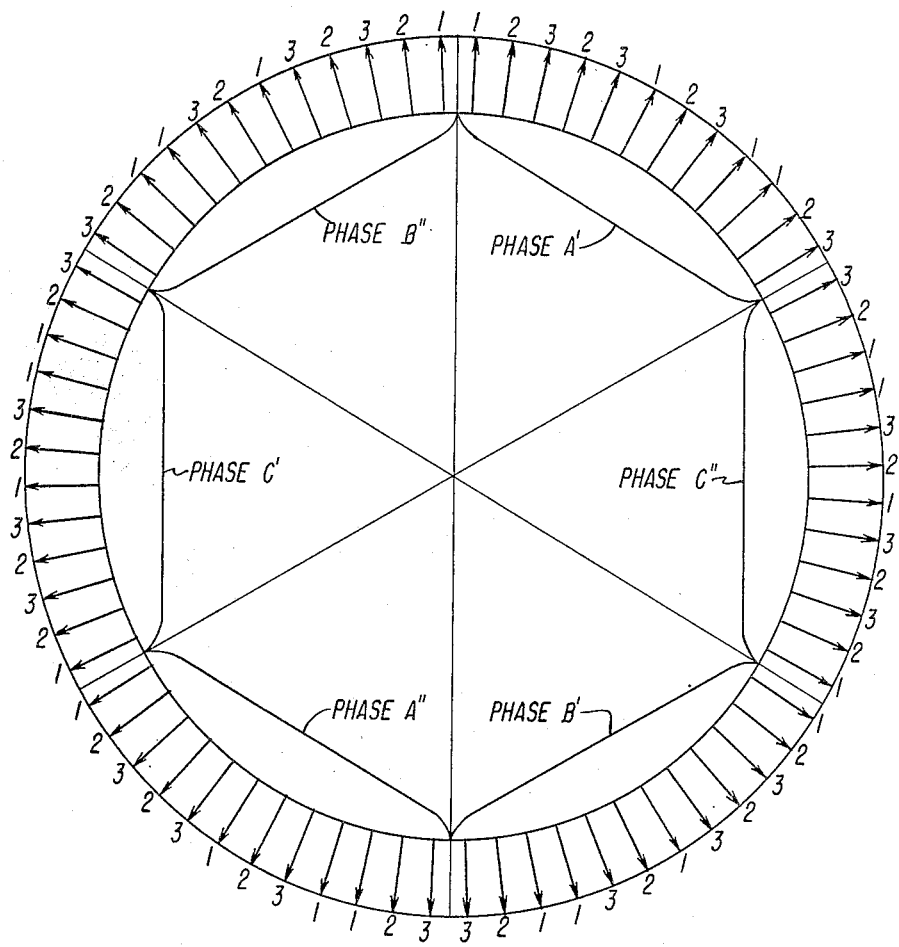
Fig. 3 is a combined schematic diagram of the phase belt arrangement in the armature winding and a vectorial diagram of the phase voltage components induced in the different coils of the armature winding.

Referring now to Figs. 1 and 2 of the drawings, there is illustrated a dynamoelectric machine 10 in the form of a turbine-driven generator, and embodying the features of the present invention. The generator 10 is of the 2-pole, 3-phase, 3-circuit type, and comprises a stationary armature element or core 11 of magnetizable material and a cooperating rotary field element represented by the poles respectively indicated at N and S. The core 11 comprises seventy-two slots 12; and a 2-layer, 3-phase winding 13 is carried by the core 11. The winding 13 comprises the three phases A, B and C and consists of seventy-two coils each including two coil sides 14 and an end connector 15. In Fig. 1, only phase A of the winding 13 is illustrated; however, in Fig. 2, the arrangement of the coil sides 14 in all three phases A, B and C of the winding 13 is illustrated. As indicated in Fig. 1, the coils are chorded having a coil pitch equal to ⅔ of the pole pitch. However, it will be understood that the invention is readily applicable to other slot arrangements and to other coil pitches.

As indicated in Fig. 3, the winding 13 comprises three positive phase belts (respectively designated A', B' and C') and three negative phase belts (respectively designated A", B" and C") that are arranged in sequence about the core 11. Each of the phase belts comprises a section of the three parallel connected circuits in the corresponding phase, and each circuit in the section consisting of four series connected coils each having two coil sides 14. The two sections of the three parallel connected circuits in the two phase belts A' and A" in phase A are properly poled and connected in series relation, since one of the phase belts is under the N pole while the other of the phase belts is under the S pole, so that the phase voltages respectively induced therein are substantially of the same magnitude and exactly in-phase; whereby phase A of the winding 13 comprises the three parallel connected circuits.

Still referring to Fig. 3, each of the six phase belts of the winding 13 subtends 60 electrical degrees and includes twelve coils. It will be noted that the positive phase belt A' includes only coils arranged in the first section of the three parallel circuits designated 1, 2 and 3; and likewise, the negative phase belt A" includes only coils arranged in the second section of the three parallel circuits designated 1, 2 and 3. Referring now to Fig. 1, it will be observed that the twelve coil sides 14 of the twelve coils arranged in the positive phase belt A' are distributed in the winding slots 12 of the core 11 in the particular pattern or sequence: 123231231123; whereby the resulting phase voltages in the first section of the three parallel connected circuits 1, 2 and 3 in this phase belt have a high degree of coincidence with each other. In a similar manner, the twelve coil sides 14 of the twelve coils arranged in the negative phase belt A" are distributed in the winding slots 12 of the core 11 in the particular pattern or sequence: 321132132321; whereby the resulting phase voltages in the second section of the three parallel connected circuits 1, 2 and 3 in this phase belt have a high degree of coincidence with each other. Further, it is noted that the sequences: 123231231123 and 321132132321 bear a "mirror image" relationship with respect to each other; whereby the resulting voltages in the three parallel connected circuits 1, 2 and 3 in phase A are exactly in-phase; and, also these voltages are of substantially the same magnitude, as more fully explained below.

As a matter of convenience, in following the circuits in Fig. 1, the coil sides 14 included in the circuit 1 have been illustrated in solid lines, the coil sides 14 included in the circuit 2 have been illustrated in broken lines, and the coil sides 14 included in the circuit 3 have been illustrated in dotted lines.

It is noted that the winding patterns of the coils included in phases B and C are identical to that of the coils included in phase A, as illustrated in Fig. 1 and described above; which condition is indicated by the arrangement and disposition of the coil sides 14 in the winding slots 12 of the core 11, as shown in Figs. 2 and 3.

Before considering the degree of voltage balance among the three parallel connected circuits 1, 2 and 3 in phase A, it is first noted that the p. u. (per unit) voltage of any one of a number of parallel circuits in a phase comprises the ratio between the open-circuit voltage generated in the one circuit and the rated voltage of the phase, and is a measurement of the magnitude of voltage unbalance between the one circuit and the phase. Similarly, the phase angle displacement between the open-circuit voltage generated in the one circuit and the rated voltage of the phase is a measurement of the phase angle of unbalance between the one circuit and the phase.

Thus, in phase A:

| Circuit | 1 | 2 | 3 |
|---|---|---|---|
| Magnitude (p. u.) | 0.99873 | 1.00057 | 1.00070 |
| Phase Angle Displacement | 0 | 0 | 0 |

This exceedingly high degree of balance among the three parallel connected circuits 1, 2 and 3 of phase A, results in the negligible relative heating of only 1.036, the exceedingly small increase above 1.000 resulting from the exceedingly small circulating currents among the three parallel connected circuits 1, 2 and 3 in phase A.

At this point, it is mentioned that in an acceptable multi-circuit winding of this character, the maximum allowable magnitude of unbalance is 0.4%; the maximum allowable phase angle displacement is 0.15°; and when the circuits of such a winding exhibits both magnitude unbalance and phase angle displacement, the limits for both of these items must be appropriately decreased in order to preserve acceptable relative heating of the winding.

Accordingly, the pattern of the winding 13 is not only acceptable, but outstanding with respect to the exceedingly high degree of voltage balance among the three parallel connected circuits in each phase thereof.

Furthermore, the reactances of the circuits 1, 2 and 3 in phase A are essentially equal, whereby the phase current in phase A is divided substantially equally in these three circuits. Therefore, the phase current supplied to the load by each of the phases A, B and C of the winding 13 is divided equally among the circuits 1, 2 and 3 therein.

The winding pattern of the two phase belts A' and A" in phase A of the generator 10, as illustrated in Fig. 1 and as described above, is set forth in tabular form, as pattern No. 1, in Table I appearing below; and in the arrangement, the slot 12 in the core 11 in which the first coil side in phase A is arranged is noted as slot "0," the next adjacent slot 12 in the core 11 is noted as slot "1," the next adjacent slot 12 in the core 11 is noted as slot "2," etc.:

Table I

| Pattern No. | Slots/Pole | Circuits/Pole | Circuit No. | Coil Sides Arranged in Slots No.— |
|---|---|---|---|---|
| 1 | 36 | 1.5 | 1 | 0, 5, 8, 9, 38, 39, 42, 47 |
|  |  |  | 2 | 1, 3, 6, 10, 37, 41, 44, 46 |
|  |  |  | 3 | 2, 4, 7, 11, 36, 40, 43, 45 |

Considering now the application of the present invention to other cores 11 having different numbers of slots 12 per pole, four other winding patterns are disclosed in Table II below (utilizing the same system of notations):

Table II

| Pattern No. | Slots/Pole | Circuit/Pole | Circuit No. | Coil Sides Arranged in Slots No. |
|---|---|---|---|---|
| 2 | 27 | 1.5 | 1 | 0, 3, 6, 29, 32, 35 |
|  |  |  | 2 | 1, 4, 7, 28, 31, 34 |
|  |  |  | 3 | 2, 5, 8, 27, 30, 33 |
| 3 | 31.5 | 1.5 | 1 | 0, 3, 6, 9, 33, 36, 39 |
|  |  |  | 2 | 1, 2, 5, 34, 35, 40, 41 |
|  |  |  | 3 | 4, 7, 8, 31, 32, 37, 38 |
| 4 | 31.5 | 1.5 | 1 | 0, 4, 5, 6, 10, 34, 39 |
|  |  |  | 2 | 2, 7, 9, 32, 35, 36, 40 |
|  |  |  | 3 | 1, 3, 8, 33, 37, 38, 41 |
| 5 | 40.5 | 1.5 | 1 | 0, 3, 10, 13, 43, 46, 47, 48, 51 |
|  |  |  | 2 | 2, 5, 6, 8, 11, 41, 44, 50, 53 |
|  |  |  | 3 | 1, 4, 7, 9, 12, 42, 45, 49, 52 |

Of course, it will be understood that all of the winding patterns set forth in Table II above are not as advantageous as the preferred winding pattern set forth in Table I above, since the unbalance of the phase voltages of the three circuits in some of these winding patterns is somewhat greater than that involved in the preferred winding pattern set forth in Table I above. Specifically, the relative heating of these different winding patterns are set forth in Table III below:

Table III

| Pattern No.: | Relative heating |
| --- | --- |
| 1 | 1.036 |
| 2 | 1.203 |
| 3 | 1.094 |
| 4 | 1.117 |
| 5 | 1.269 |

The winding arrangement of the present invention is very advantageous in view of the fact that it accommodates the three parallel connected circuits per phase in the winding 13, effecting a very substantial reduction in the voltages encountered in the generator 10, while maintaining a given k. v. a. rating thereof; whereby the arrangement permits a corresponding reduction in the thickness of the insulation of the casings enclosing the coil sides 14. Now this further permissible reduction in the thickness of the insulation of the casings enclosing the coil sides 14 renders available additional space in the slots 12 in the core 11; which additional space may be used for various additional design purposes. For example, the width of the winding slots may be reduced, so as to effect an increase in the cross-sectional area of the magnetic material of the core 11; on the other hand, the cross-sectional area of the conductors of the coil sides 14 may be increased, or the cross-sectional area of the cooling ducts disposed in the slots 12 of the core 11 may be increased. Accordingly, it will be appreciated that the arrangement of the winding 13 reduces the voltages encountered in the generator 10, without reducing the k. v. a. rating thereof; whereby the permissible reduction in the required thickness of the insulation of the casings of the coil sides 14 provides the additional space in the winding slots 12 in the core 11 that is available for utilization in design factors effecting an increased rating of the generator 10, and without increasing the physical dimensions thereof.

Moreover, the armature winding arrangement is not limited to any one specific winding slot design in the core 11, or to any one specific core arrangement or structure in the phase belts included in the phases of the generator 10 (as indicated by Table II above), and may be generally applied to a wide variety of standard core structures and coil arrangements and structures; whereby the present invention has a wide field of utilization in polyphase generators.

In view of the foregoing, it is apparent that there has been provided in a polyphase generator, an improved armature winding arrangement that is effective substantially to increase the power output of the generator, without increasing the physical dimensions thereof, and that is exceedingly flexible with reference to other generator design factors.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. A dynamoelectric machine comprising a polyphase winding and a multi-slot core therefor, each phase of said winding including three parallel connected circuits arranged in two series connected sections respectively disposed in two oppositely poled phase belts, each circuit in each phase belt being provided with a number of series connected coils each having two coil sides and arranged in corresponding ones of the slots in said core, the adjacent coil sides of the three circuits of any given phase being disposed in a first sequence in one of the corresponding phase belts and the adjacent coil sides of the three circuits of the given phase being disposed in a second sequence in the other of the corresponding phase belts, whereby the three phase voltages respectively induced in the three parallel connected circuits of any phase of said winding having a high degree of congruency with a magnitude of unbalance not in excess of 0.4% and a phase angle displacement not greater than 0.15°, so as to introduce no substantial differences in the $I^2R$ losses in the three parallel connected circuits of any phase of said winding.

2. The dynamoelectric machine set forth in claim 1, wherein each circuit per phase is provided with eight series connected coils arranged in the two corresponding phase belts, said first sequence runs: 123231231123, and said second sequence runs: 321132132321; where the numerals "1," "2" and "3" respectively indicate the coil sides serially connected in the respective ones of the three parallel connected circuits in the given phase of said winding.

3. The dynamoelectric machine set forth in claim 1, wherein said core is provided with 72 slots per pair of poles and said winding comprises three phases and is arranged in two layers in the slots of said core, and each of said two phase belts per phase includes twelve chorded coils.

4. The dynamoelectric machine set forth in claim 1, wherein each circuit per phase is provided with six series connected coils arranged in the two corresponding phase belts, said first sequence runs: 123123123, and said second sequence runs: 321321321; where the numerals "1," "2" and "3" respectively indicate the coil sides serially connected in the respective ones of the three parallel connected circuits in the given phase of said winding.

5. The dynamoelectric machine, set forth in claim 1, wherein said core is provided with 54 slots per pair of poles and said winding comprises three phases and is arranged in two layers in the slots of said core, and each of said two phase belts per phase includes nine chorded coils.

6. The dynamoelectric machine set forth in claim 1, wherein each circuit per phase is provided with seven series connected coils arranged in the two corresponding phase belts, said first sequence runs: 1221321331, said second sequence runs: 33122133122, where the numerals "1," "2" and "3" respectively indicate the coil sides serially connected in the respective ones of the three parallel connected circuits in the given phase of said winding.

7. The dynamoelectric machine set forth in claim 1, wherein each circuit per phase is provided with seven series connected coils arranged in the two corresponding phase belts, said first sequence runs: 13231112321, said second sequence runs: 2312233123, where the numerals "1," "2" and "3" respectively indicate the coil sides serially connected in the respective ones of the three parallel connected circuits in the given phase of said winding.

8. The dynamoelectric machine set forth in claim 1, wherein said core is provided with 63 slots per pair of poles and said winding comprises three phases and is arranged in two layers in the slots of said core, and the two phase belts per phase respectively include ten and eleven chorded coils.

9. The dynamoelectric machine set forth in claim 1, wherein each circuit per phase is provided with nine series connected coils arranged in the two corresponding phase belts, said first sequence runs: 13213223231231, said second sequence runs: 2312311132132, where the numerals "1," "2" and "3" respectively indicate the coil sides serially connected in the respective ones of the three parallel connected circuits in the given phase of said winding.

10. The dynamoelectric machine set forth in claim 1, wherein said core is provided with 81 slots per pair of poles and said winding comprises three phases and is arranged in two layers in the slots of said core, and the two phase belts per phase respectively include fourteen and thirteen chorded coils.

11. A dynamoelectric machine comprising a polyphase winding and a multi-slot core therefor, each phase of said winding including three parallel connected circuits arranged in two series connected sections respectively disposed in two oppositely poled phase belts, each circuit in each phase belt being provided with four series connected coils each having two coil sides and arranged in corresponding ones of the slots in said core, the adjacent coil sides of the three circuits of any given phase being disposed in the sequence: 123231231123 in one of the corresponding phase belts and the adjacent coil sides of the three circuits of the given phase being disposed in the sequence: 321132132321 in the other of the corresponding phase belts, where the numerals "1," "2" and "3" respectively indicate the coil sides serially connected in the respective ones of the three parallel connected circuits in the given phase of said winding.

12. The dynamoelectric machine set forth in claim 1, wherein the first and second sequences bear a "mirror image" relationship with respect to each other.

References Cited in the file of this patent
UNITED STATES PATENTS

| 2,015,562 | Kilgore | Sept. 24, 1935 |

FOREIGN PATENTS

| 518,135 | Great Britain | Feb. 19, 1940 |